Nov. 8, 1955 M. SLAVIN III 2,723,387
SEISMIC PROSPECTING SYSTEM
Filed May 18, 1953 6 Sheets-Sheet 1

FIG. 1.

INVENTOR.
MATTHEW SLAVIN III,
BY
Reed␣Lawlor
ATTORNEY.

Nov. 8, 1955 — M. SLAVIN III — 2,723,387

SEISMIC PROSPECTING SYSTEM

Filed May 18, 1953 — 6 Sheets-Sheet 2

MATTHEW SLAVIN III,
INVENTOR.

BY *Reed Lawlor*
ATTORNEY.

Nov. 8, 1955    M. SLAVIN III    2,723,387
SEISMIC PROSPECTING SYSTEM
Filed May 18, 1953    6 Sheets-Sheet 4

INVENTOR.
MATTHEW SLAVIN III,
BY
Reed Lawlor
ATTORNEY.

Nov. 8, 1955 M. SLAVIN III 2,723,387
SEISMIC PROSPECTING SYSTEM
Filed May 18, 1953 6 Sheets-Sheet 5

Matthew Slavin III,
INVENTOR.

INVENTOR.
MATTHEW SLAVIN III,
BY
Reed Lawlor
ATTORNEY.

United States Patent Office 2,723,387
Patented Nov. 8, 1955

2,723,387
SEISMIC PROSPECTING SYSTEM

Matthew Slavin III, Pasadena, Calif., assignor, by mesne assignments, to United Geophysical Corporation, Pasadena, Calif., a corporation of California Application May 18, 1953, Serial No. 355,506

19 Claims. (Cl. 340—15)

This invention relates to improvements in seismic prospecting systems and more particularly to improvements in apparatus for amplifying a train of seismic waves employed for investigating the nature of geological structures.

In seismic prospecting, as it is usually practiced, seismic waves are generated at a shot-point near the surface of the earth by detonating an explosive charge placed in a bore hole. As the waves so generated travel downwardly through the earth, they are partially refracted, reflected and diffracted by interfaces between successive geological strata or by other irregularities in the subsurface formations. As a result, even though the seismic waves generated at the shotpoint may be of short duration, trains of seismic waves of long duration are returned to various reception points at the surface of the earth. The various trains of seismic waves reaching different reception points are detected by seismometers that convert them into corresponding electrical wave trains. The electrical wave trains (which are sometimes referred to hereinafter as "seismic wave trains") are then amplified electrically and are recorded by means of a multiple-element oscillograph, thereby producing a seismogram bearing traces that represent the seismic wave trains received at the various reception points. Seismic waves which travel from the shotpoint to the subsurface formations and thence to the various reception points are identified on the seismogram by comparison or correlation methods. The times required for such waves to travel from the shotpoint to the reception points are employed to determine the nature and structure of the formations. In this way, it is possible to locate formations bearing mineral deposits, such as petroleum.

Generally speaking, the amplitude of the seismic wave received at the very commencement of a wave train is relatively great. The amplitudes of the early arrivals then increase very rapidly, often attaining a maximum amplitude within as little time as 0.05 second or less. Thereafter, though the waves fluctuate in amplitude, they are of generally diminishing amplitude and later arrivals are of very low amplitude. Ordinarily it is desirable to restrict the amplitudes of the recorded traces to about the distance between traces in order that the recorded waves may be readily identified and compared. In order to achieve this result, it is customary to vary the amplification of the amplifier through which the waves are passed in such a way as to compensate for large differences in amplitudes of waves in different portions of the seismic wave trains.

Inasmuch as the amplitude of the early arrivals may be as much as one hundred thousand times as great as the amplitude of the seismic waves received at the end of the recorded portion of the wave train, it is desirable to employ amplifiers that have a high value of maximum gain and have suitable gain-control means for varying the gain over a wide range. Furthermore, it is desirable to employ a gain-control system that will maintain the gain of a seismic wave amplifier at an intermediate value at the inception of the wave train to facilitate recording sharp first breaks and that will produce relatively low values of gain when the other early arrivals are received so that the amplifiers will not become disabled or paralyzed for an excessive period, and that will thereafter increase and vary the gain to compensate for the diminishing amplitudes of the waves.

In an attempt to produce satisfactory records, automatic volume control (AVC) systems have been employed. In addition, time-gain control systems have been employed. Also, combinations of such systems have been employed. None of them, however, has proved entirely satisfactory. One disadvantage of such systems has been that the various amplifiers of a seismic recording system are likely to have somewhat different amplification characteristics at the very inception of the wave trains due to differences in tube characteristics and other elements in the amplifiers. Such differences in characteristics have been overcome in the past only by making individual adjustments of the amplifiers. Another disadvantage of such systems is that frequently the amplifiers have been overloaded to such an extent by early arrivals that the amplifiers have become disabled or paralyzed for an extended period, resulting in insufficient amplification of early reflected seismic waves, thereby "pinching" the seismograph record.

One object of the invention is to provide a seismic wave amplifying system of high overall maximum gain and which is capable of wide variations in gain suitable for amplifying various parts of a train of seismic waves to a value suitable for recording within a restricted range.

Another object of the invention is to provide a system for eliminating pinching of seismograph records.

One object of the invention is to provide a system for presetting the initial value of gain of a seismic wave amplifier employing AVC at a predetermined desired value substantially independent of the variations in constants of circuit elements.

Another object of the invention is to provide an amplifier system employing two AVC loops having gains preset by injection of a high-frequency gain-control wave from a single source without danger of oscillating.

Another object of the invention is to provide such a system in which the amplitude of the high-frequency gain-control waves applied to the amplifier initially possesses a relatively high value and subsequently decreases as a function of time.

Another object of the invention is to provide a multichannel seismograph in which the gains of the amplifiers are preset by a gain-control wave to produce recordings of sharp first breaks representing first arrivals of unequal amplitudes and which operate to produce legible recordings of later arrivals, the latter recordings having about the same amplitudes in the different channels.

Another object of this invention is to provide a multichannel seismograph employing amplifiers in which the gains of the amplifiers are automatically preset at different predetermined values irrespective of variations in constants of amplifier circuit constants, so that all channels will possess desired unequal gains initially when seismic wave trains of different initial strengths are received.

Another object of the invention is to provide such a multiple-channel seismograph with a gain-control system employing a source of high-frequency gain-control waves without danger of detrimental cross-feed between channels.

The foregoing and other objects of this invention, together with various advantages thereof, will be understood from a consideration of a description of several embodiments of the invention which are illustrated in the accompanying drawings wherein like symbols represent like parts, and in which.

In accordance with the present invention as embodied in various forms thereof that are specifically described herein, the amplifier in each channel of a reflection seismograph is divided into a series of sections, each of which is provided with its own AVC network, and high-frequency gain-control waves are applied to the inputs of the separate sections and the amplitudes of these gain-control waves are controlled in such a way that the amplifier sections initially have intermediate or low gains and thereafter have gains which vary partly as a function of the high-frequency electrical waves and partly as a function of the amplitudes of the seismic valves applied thereto. To effect the desired control in the AVC systems specifically disclosed, a variable attenuator is employed at the input of each of the amplifier sections. The attenuation produced by each of the attenuators is controlled by the output of the AVC network associated with each amplifier section, and all of the waves amplified thereby, including both the seismic waves and the high-frequency gain-control waves, are passed through each attenuator to its corresponding amplifier section. In all forms of the invention disclosed, a common source of high-frequency electrical waves is employed for controlling the gains of the various amplifier sections. In some forms of the invention, a common gain-control means is employed to vary the amount of gain-control wave applied to all the amplifiers equally. In other forms, a number of gain-control means are employed to vary the amount of gain-control wave applied to the respective amplifiers individually. In some forms of the invention, the operation of the gain-control means is initiated at or about the time the seismic waves are received. In other forms of the invention, the operation of the gain-control means is initiated at about the time the seismic wave trains are generated. In the systems described, the amplitude of the high-frequency electrical wave applied to the seismic wave amplifiers is controlled in such a way that the gains of the amplifier sections are set initially by the gain-control wave and are thereafter controlled partly by the gain-control wave and the seismic waves and finally only by the seismic waves.

Figure 1:
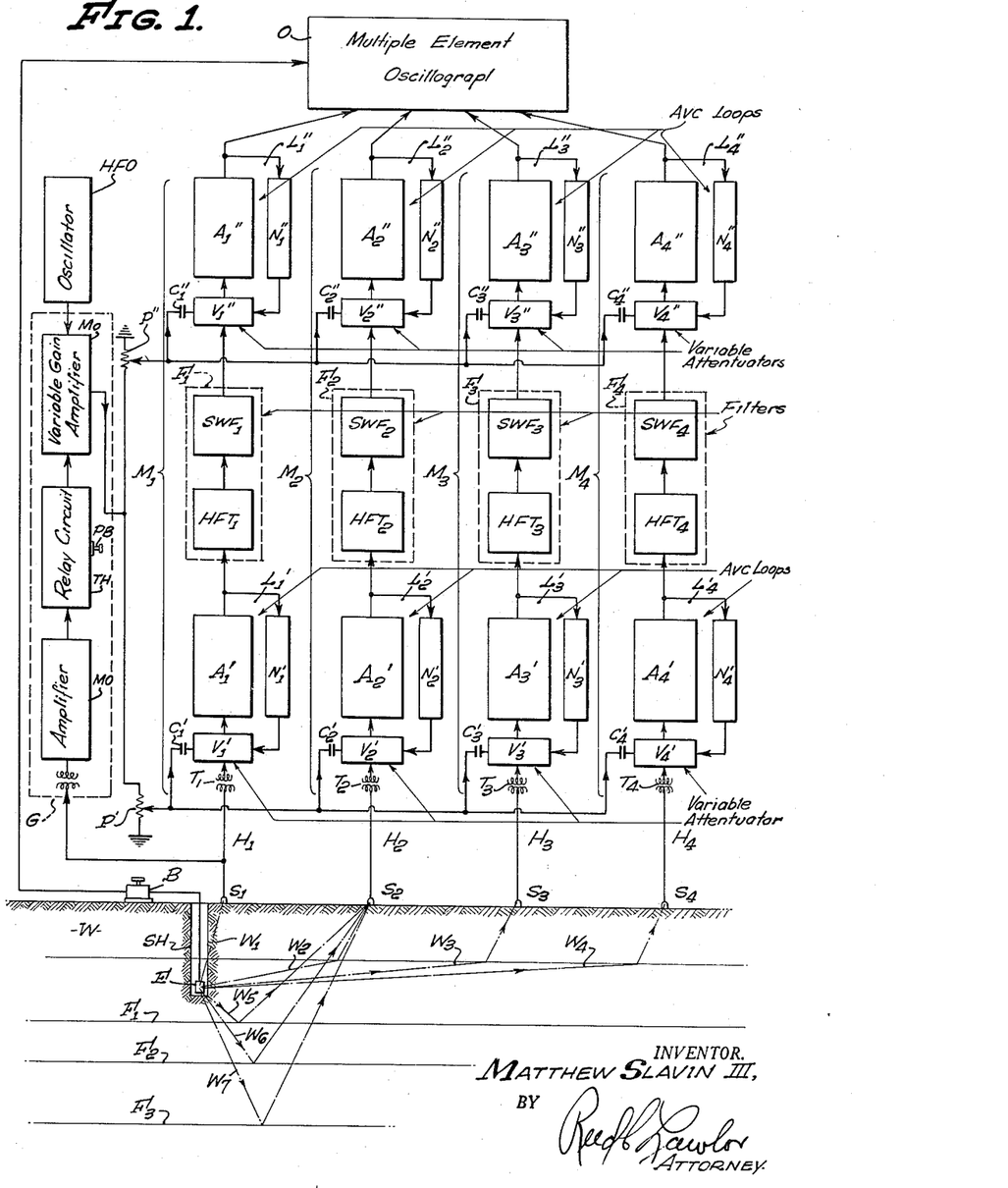
Fig. 1 is a schematic diagram of a four-channel seismograph employing this invention.

Referring to the drawings, and more particularly to Fig. 1, there is illustrated a multiple channel seismograph that includes a plurality of channels $H_1$, $H_2$, $H_3$ and $H_4$, a multiple-element oscillograph O, and a common gain-control device G including a high-frequency oscillator HFO. In practice, as many as twelve, twenty-four or even more channels are employed in such a seismograph. However, for purposes of illustration, a seismograph employing only four such channels is illustrated and described. Inasmuch as all the channels are of substantially identical construction, identical symbols will be employed to represent corresponding identical parts in the respective channels, except, however, that subscripts 1, 2, 3 and 4 are employed to indicate the corresponding channel $H_1$, $H_2$, $H_3$ and $H_4$, respectively, in which the part is located, and these subscripts are frequently omitted where the description applies equally to all channels.

Each of the seismograph channels H comprises an amplifier M having an input connected to a seismometer S and an output connected to a corresponding galvanometer element (not shown) in the multiple-element oscillograph O.

The seismometers $S_1$, $S_2$, $S_3$ and $S_4$ are of a conventional type which are adapted to convert seismic waves received by them into electrical waves of corresponding amplitude and frequency. The seismometers $S_1$, $S_2$, $S_3$ and $S_4$ are located at mutually spaced points in the earth in a suitable spacial relationship with respect to a shothole SH drilled to a suitable depth into the earth. Ordinarily the seismometers are located in a line at the surface of the earth in a spread that may be as much as about one-quarter to one-half a mile or more in length. In the arrangement illustrated, the seismometers are located in a spread that is commonly referred to as a "single ender," and in this particular case, the seismometer $S_1$ is located at the top of the shothole SH and the remaining seismometers $S_2$, $S_3$ and $S_4$ are located at uniform intervals at increasing distances from the shothole. Usually the seismometer interval is of the order of one hundred feet or so.

The seismograph illustrated includes a blaster B which is employed to detonate a charge of explosive E located at some suitable depth in the shothole SH. When the charge is detonated, seismic waves travel outwardly therefrom in all directions. Some of these waves travel along the path $W_1$ directly to the seismometer $S_1$ at the top of the shothole SH. Others travel by paths $W_2$, $W_3$, $W_4$ involving refraction of waves at the bottom of the weathered layer W to the remaining seismometers $S_2$, $S_3$ and $S_4$. Other waves travel downwardly and upon encountering interfaces $F_1$, $F_2$ and $F_3$ between successive strata beneath the surface of the earth, they are partially reflected, returning to the surface of the earth where they are detected by the seismometers $S_1$, $S_2$, $S_3$ and $S_4$. For purposes of illustration, only the reflection paths $W_5$, $W_6$ and $W_7$ are indicated along which travel some waves that are reflected and returned to the seismometer $S_2$. In addition, waves which are reflected from fault faces or refracted at various interfaces between the underlying strata or which are diffracted by other types of discontinuities, are also returned to the surface of the earth. By virtue of the return of waves from various discontinuities, a train of seismic waves of relatively long duration is received by each of the seismometers. It is not uncommon for the first arrivals to reach the farthermost seismometer of a spread as much as about 0.15 sec. or even longer after reaching the nearest seismometer. The disparity of arrival times of waves reflected from a particular interface is often much less, especially when the reflecting beds have relatively low dips of 15° or less.

Figure 2A:
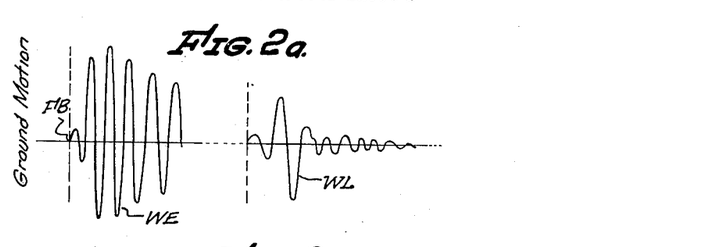
Fig. 2 represents a series of time coordinated graphs employed in explaining the invention.
Figure 2B:
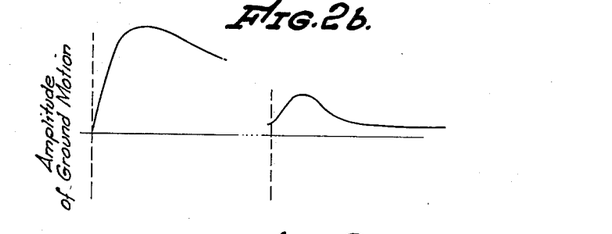
Figure 2C:
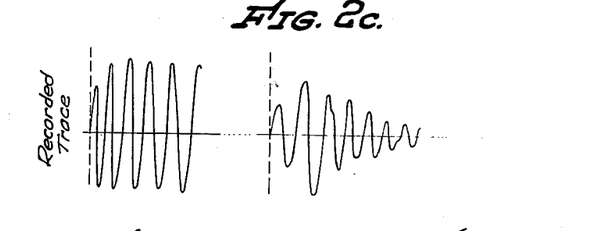

In Fig. 2a there is shown a broken fragmentary graph representing parts of a train of seismic waves arriving at one of the seismometers. Here it will be noted that the moment of the arrival of the seismic wave train is indicated by a sharp movement of the earth indicated by the first break FB. Immediately the amplitude of the waves rises to a very high value. Thereafter, the amplitude of the waves generally decreases with time, subject, however, to relatively minor fluctuations. In Fig. 2b there is indicated the general manner in which the amplitude of such a seismic wave train varies with time. In practice, the maximum amplitude of waves at the commencement of the wave train is thousands of times greater than the amplitude of the waves received much later. In both Figs. 2a and 2b the ordinate scales for early arrivals $W_E$ and late arrivals $W_L$ are different, the latter being highly amplified in order that the late arrivals may be shown on the seismograph. Also, as indicated, the time scales of the two parts of these graphs are unequal.

As the seismic waves are received by the respective seismometers, they are converted into corresponding electrical wave trains which are in turn amplified by the amplifiers M and applied to corresponding galvanometer elements in the oscillograph O. In this way a record is obtained in the form of a conventional seismogram consisting of a plurality of traces in side-by-side relationship. To aid in the study of the seismogram, a timer (not shown) is employed to record timing lines on the seismogram that indicate the instants that various parts of the wave trains are recorded. In addition, a record in the form of a time break is made to indicate the instant of detonation of the charge E. Generally speaking, in order to obtain data regarding the nature and structure of strata at great depths, records are made of the waves received during a period of many seconds following the instant of detonation of the charge E. Though the amplitude of a wave train varies greatly as a function of time according to local conditions, in a typical example, the early arrivals frequently attain a maximum amplitude within about 0.05 second and the amplitude of the wave train then attenuates rapidly at a rate of about 30 db/sec. or more for one second, then at an average rate of about 20 db/sec. for another second, and then at about 15 db/sec. or less for many seconds. Some reflected waves are received at about 0.1 or 0.2 second after the reception of the first arrivals and other reflected waves are received continually at irregular intervals thereafter. Often the presence of such reflected waves is indicated by a temporary increase in amplitude over a period of about 0.05 second or more.

Inasmuch as the reflected waves that are received a few tenths of a second and later after the first arrivals have amplitudes which are very small compared to those of the early arrivals, the gains of the amplifiers M must be varied greatly and rapidly in order to record both the first break and early reflections with amplitudes that will facilitate examination and comparison of the traces. At the same time, the gain of the amplifiers must be controlled in such a way that the character of the individual waves is not destroyed and so that bursts of energy representing waves returned to the surface from various interfaces may be readily recognized.

In the seismograph of Fig. 1, each of the amplifiers M comprises an input transformer T, a first or input amplifier loop L', a filter F, and a second or output amplifier loop L" connected in the order named. Each input amplifier loop L' comprises an amplifier section A', a variable attenuator V' at its input, and a corresponding AVC network N' associated therewith. Likewise each output amplifier loop L" comprises an amplifier section A", a variable attenuator V" at its input and an AVC network N" associated therewith. Inasmuch as the AVC loops L' and L" are of substantially identical construction, identical symbols will be employed to represent identical or corresponding parts and characteristics of the respective loops, except, however, that superscripts ' and " are employed to indicate the corresponding loop L' and L", respectively, in which the part is located or to which the characteristic pertains, although these superscripts are frequently omitted where the description applies equally to all channels.

Each of the AVC networks N amplifies and rectifies electrical waves appearing at the output of the corresponding amplifier section A. The rectified output of each AVC network is applied to the variable attenuator V at the input of the corresponding amplifier section A in such a way as to vary the gain of the amplifier section as an inverse function of the amplitude of the signal appearing at the output of the amplifier section in question under steady state conditions. Inasmuch as each of the amplifier sections has a very nearly flat response characteristic in its AVC range, in this range the attenuation produced by the attenuator at the input of the amplifier section under steady state conditions is approximately proportional to the amplitude of the input signal.

According to this invention, gain-control waves supplied from the high-frequency oscillator HFO are employed to preset the gains of the amplifiers M prior to the reception of the seismic wave trains.

In the system of Fig. 1, the gain-control waves from the high-frequency oscillator HFO are applied to the inputs of the variable attenuators V through corresponding coupling condensers C' and C". A portion of the output of the high-frequency oscillator HFO is thus applied from a common potentiometer P' through coupling condensers $C_1'$, $C_2'$, $C_3'$, $C_4'$, to the inputs of the corresponding first variable attenuators $V_1'$, $V_2'$, $V_3'$ and $V_4'$. Likewise, a portion of the output of the high-frequency oscillator HFO is thus applied from a common potentiometer P" through coupling condensers $C_1''$, $C_2''$, $C_3''$, $C_4''$ to the inputs of the corresponding second variable attenuators $V_1''$, $V_2''$, $V_3''$ and $V_4''$.

All of the amplifier sections $A_1'$, $A_2'$ ... $A_4'$ and $A_1''$ ... $A_4''$ have uniform amplification characteristics throughout the range of seismic wave frequencies to be recorded and also at the frequency of the high-frequency oscillator HFO. The filters $F_1$ ... $F_4$, however, are designed to prevent the transmission of any significant portion of the high-frequency control wave appearing at the output of the corresponding first amplifier section A' to the input of the corresponding second variable attenuator V". Each of the filters F, however, is also designed to transmit through each of the amplifiers M waves in the range of frequencies of seismic waves which it is desired to record by means of the oscillograph O. For this purpose, each of the filters F may include a high-frequency trap HFT and a seismic-wave filter SWF. The high-frequency trap HFT may be designed to discriminate against waves having the frequency of the high-frequency oscillator HFO without, however, attenuating any waves of seismic wave frequency, as indicated in the graph $g_1$ of Fig. 3. The seismic-wave filter SWF may be of any suitable type adapted to pass waves in a selected band of seismic wave frequencies and to discriminate against waves of nearby frequencies as indicated in the graph $g_2$ of Fig. 3. Such a seismic-wave filter, for example, may have a pass-band between about thirty cycles per second and about sixty cycles per second, thus permitting recording of seismic waves over a range of frequencies from about fifteen cycles per second to about one hundred twenty cycles per second and discriminating against ground roll and also wind noise, and the like, as is well known.

In this seismograph, either electrical waves produced by each seismometer or high-frequency gain-control waves supplied by the oscillator HFO, or both, are passed through the first variable attenuator V' and thence through the amplifier A'. The amplified signal appearing at the output of the amplifier section A' is rectified and amplified in the first AVC network N', and the output of this network is employed to control the attenuation of the variable attenuator V' to produce at the output of the amplifier section A' a signal having an amplitude that is substantially constant except for short-term variations. The controlled output of each of the first amplifier sections A' is then transmitted through the corresponding filter F and applied, together with a portion of the gain-control wave from the oscillator HFO, to the input of the second variable attenuator V". The attenuated signal transmitted through the variable attenuator V" is applied to the second amplifier section A"

and the output thereof is applied to the second AVC network N" where it is amplified and rectified in the second AVC network N". As before, the output of this network is employed to control the attenuation of the second variable attenuator. The output of the second amplifier section A" is applied directly to a corresponding galvanometer element of the oscillograph O. Each of the galvanometers of the oscillograph O is tuned to a frequency above those of the seismic waves to be recorded, but below the frequency of the gain-control wave, thus making it possible to record on the seismogram traces representing the seismic waves without any noticeable disturbance from a recording of the gain-control wave. In case the resonant frequency of the galvanometers of the oscillograph O is higher than the frequency of the gain-control wave, high-frequency traps are connected between the outputs of the second amplifier sections A" and the corresponding galvanometer elements. When the oscillograph is tuned as mentioned above, the output of the amplifier M is filtered mechanically; and when such high-frequency traps are employed, the output is filtered electrically.

According to this invention, the amplitude of the control wave impressed upon the variable attenuators $V_1'$ ... $V_4'$ and $V_1''$ ... $V_4''$ is set initially at a high value and is reduced as a controlled function of time, commencing from about the time that the train of seismic waves arrives at the seismometers $S_1$ ... $S_4$. In one system for achieving this purpose, electrical waves appearing at the output of one of the seismometers, such as the seismometer $S_1$ located at the top of the shothole SH, are applied to the gain-control device G comprising an amplifier $M_0$, a relay circuit TH and a variable gain amplifier $M_G$. Thus the waves from the seismometer S are amplified by the amplifier $M_0$ and are impressed upon a relay circuit TH. This relay, which is generally in a normally restored condition, is operated by a wave applied thereto above a predetermined value, thus initiating the operation of the variable gain amplifier $M_G$ through which waves from the high-frequency oscillator HFO are applied to the amplifiers $M_1$ ... $M_4$. The amplification produced in the amplifier $M_0$ is high enough to cause this predetermined value to be attained in 0.001 second or less. The variable gain amplifier $M_G$ is designed and operated to have its gain vary as a decreasing function of time so that the amplitude of the gain-control wave applied to the potentiometers P' and P" decreases as a function of time. Upon the completion of the recording of a seismogram, the relay TH is restored by manipulation of a push-button switch PB.

Figure 4:
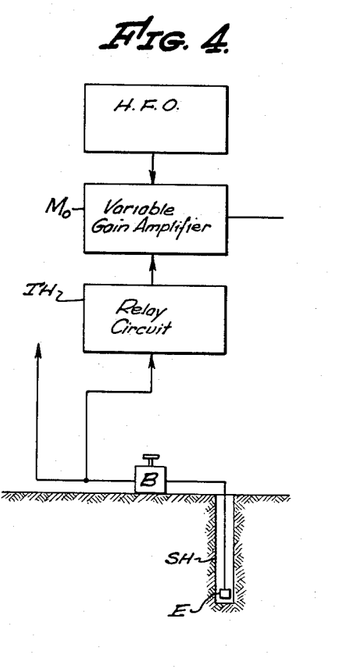
Fig. 4 is a schematic diagram of an alternative form of the invention.

In an alternative method of initiating the operation of the variable gain amplifier $M_G$ illustrated in Fig. 4, a signal from the blaster B is applied to the relay TH. Upon operation, the relay actuates the variable gain amplifier MO to effect the desired operation.

Figures 5, 7:
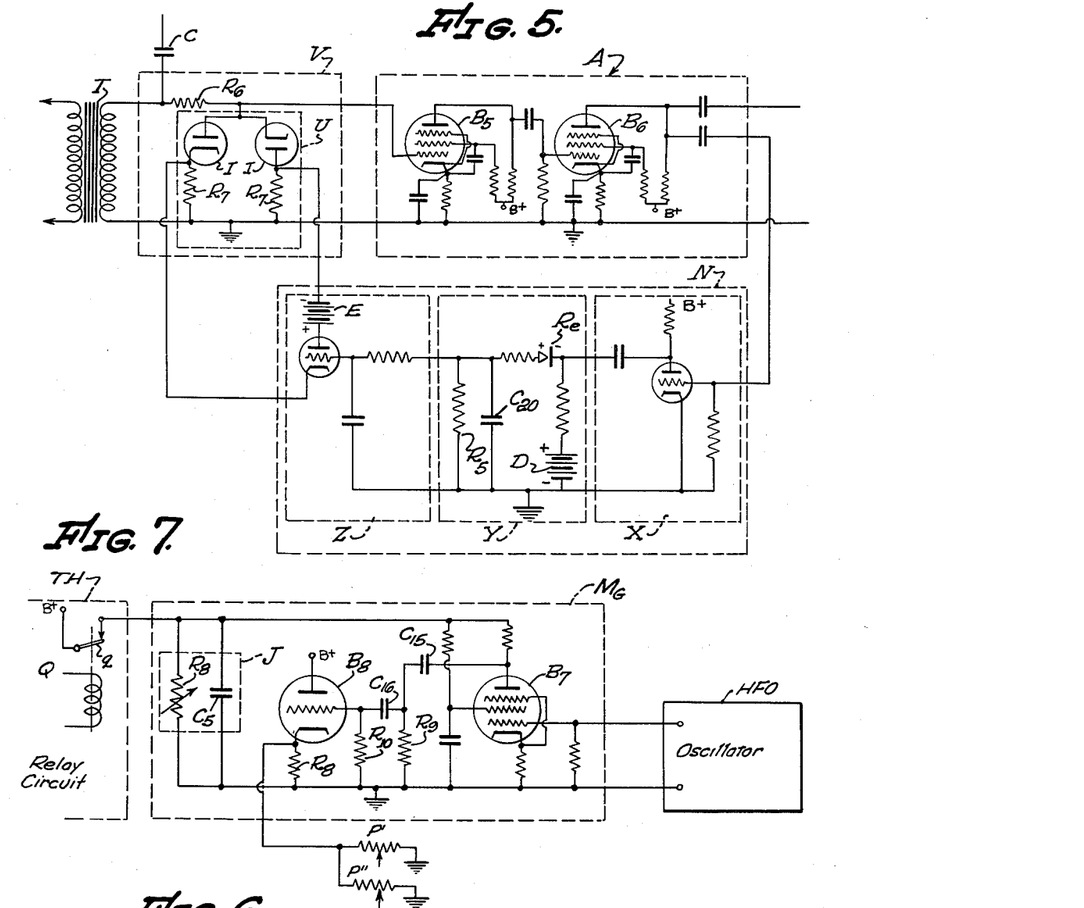
Fig. 5 is a wiring diagram of an AVC loop employed in the invention.
Fig. 7 is a wiring diagram of a gain-control amplifier employed in the invention.

In Fig. 5 there is illustrated schematically a typical arrangement of amplifier section A, variable attenuator V, and AVC network N. As illustrated, the attenuator V is supplied signals from the output of the transformer T and also through a coupling condenser C. The input element T may be one of the input transformers of one of the amplifiers M or it may be any other transformer or, if desired, the filter F that feeds the input of the second variable attenuator V".

Each of the amplifier sections A is of high fidelity and comprises two stages respectively including two pentodes $B_5$ and $B_6$ coupled in conventional manner by means of resistors and condensers. The values of the coupling elements are so selected that the amplifier section A amplifies signals without frequency discrimination, both in the band of seismic-wave frequencies of interest and at the frequency of the gain-control wave.

The AVC network N includes an input amplifier stage X, a rectifier stage Y, and an output amplifier stage Z connected in the order named. The input amplifier stage X is connected to the output of the main amplifier section A and is designed to amplify alternating current signals appearing at the output of the amplifier section A prior to supplying these signals to the rectifier Y. It is not necessary for the amplifier stage X to be distortionless, as the signal transmitted therethrough is not recorded but is only employed to produce direct current AVC control voltages. In the rectifier Y, signals having an amplitude exceeding a threshold determined by the voltage of a battery D are rectified by a rectifier element $R_e$ and the rectified output appearing across a parallel network including a resistor $R_5$ and a condenser $C_{20}$ is applied to the grid circuit of a triode in the amplifier Z. The amplified AVC control voltage appearing at the output of the amplifier Z is employed to vary the attenuation of the attenuator V.

The attenuator V includes a series resistor $R_6$ connected between one end of the secondary winding of the transformer T and the input to the amplifier section A. The attenuator V also includes a variable shunt impedance U in the form of a lattice or bridge network with two diodes I connected in series in one branch and two equal resistors $R_7$ connected in series in the other branch. Diagonally opposite terminals at the ends of the branches are connected through a B supply E in the output of the amplifier Z. The remaining diagonally opposite terminals are connected between the series resistor $R_6$ and ground and hence across the input of the amplifier section A. With this arrangement, the effective resistance of the resistor U is a function of the AVC control voltage applied across the bridge, increasing as the voltage increases. Furthermore, so long as the amplitude of the signal voltage is small compared to portions of the AVC control voltage applied across the diodes, the effective resistance is substantially the same in both directions and is substantially linear. It is clear that the fraction of the signal transmitted through the variable attenuator V varies as a direct function of the AVC control voltage applied thereto from the output of the AVC network N.

In practice, the two amplifier sections A' and A" and the associated AVC networks of each seismograph channel are of substantially the same design and construction. As a result, the two AVC loops L' and L" have similar AVC characteristics but, since they are connected in cascade, the effective threshold of operation of one is displaced relative to that of the other when expressed in terms of the signal applied to the amplifier M.

Figure 6:
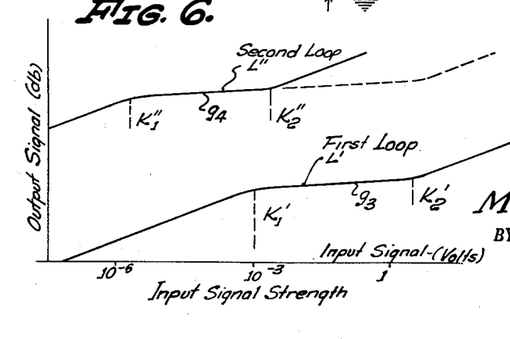
Fig. 6 is a graph showing the AVC characteristics of an amplifier and the AVC loops of which it is composed.

Before considering the operation of an amplifier M as a whole, consider for a moment the steady-state AVC characteristic of the first AVC loop L'. This characteristic is represented by the graph $g_3$ of Fig. 6. As indicated by the rising portion of the curve at the left end, the amplification is constant for small input signals. However, when the amplitude of the input signal attains a value corresponding to a threshold indicated by the point $K_1'$ determined by the voltage of the battery D' in the first AVC network N', the direct current control voltage applied by the amplifier Z' to the resistor attenuator V' is decreased, causing the value of the resistance of resistor U' to decrease. As the amplitude of the input signal to the amplifier A' continues to increase, the magnitude of the direct current control voltage produced by the first AVC network N' decreases, thereby maintaining the amplitude of the signal appearing at the output of the amplifier section A' very nearly constant, though slightly increasing as a function of input signal amplitude. However, when the direct current voltages being produced by the rectifier Y' approach such a magnitude that the value of the resistances of the diodes no longer decrease because of their inherent characteristics or because of overloading of either amplifier X' or Z', the AVC loop L' saturates. Thereafter, as the amplitude of the input signal increases, the amplitude of the output of the amplifier section A' also increases, as indicated by the rising portion of the graph to the right of the saturation point $K_2'$, finally reaching a point (not indicated) at which the amplifier section A″ overloads. In any event, it is seen that in the AVC region between the lower limit $K_1'$ and the upper limit $K_2'$, excellent AVC action is obtained in the first loop L′. The ratio of the limits $K_1'$ and $K_2'$ $$r = \frac{K_2'}{K_1'}$$

is known as the AVC range. For convenience, the magnitude of the output between the limits of the AVC range zone is here referred to as the AVC level, the value at point $K_1'$ being called the minimum AVC level and the value at the upper limit $K_2'$ being called the maximum AVC level. It is to be noted that the AVC action just described is the same at the frequencies of seismic waves and at the frequency of the gain-control wave.

The characteristic of the second AVC loop L″ is the same as that of the first AVC loop L′ when considered separately and apart from the circuit in which it is employed and in terms of the signal impressed on its input. But the action of the second AVC loop is somewhat different from that of the first AVC loop when considered in terms of the signal being applied to the input of the amplifier M. To appreciate this difference, consider for a moment the action of the second AVC loop L″ when connected to the output of the first AVC loop L′. In this case, the steady-state characteristic of the second AVC loop L″ is indicated by the solid line graph $g_4$ of Fig. 6. In this case also, as indicated by the rising portion of the curve at the left end thereof, the amplification is constant for small input signals. However, when the amplitude of the input signal attains a value corresponding to a threshold indicated by the point $K_1''$ determined by the voltage of the battery D″ in the second AVC network N″ and the gain of the first AVC loop L′, the direct current control voltage applied by the amplifier Z″ to the resistor U″ is reduced, causing its resistance to decrease. It is clear that the threshold $K_1''$ of the second AVC loop occurs at a lower value of input signal strength than the threshold $K_1'$ occurs for the first AVC loop L′. In fact, the values of the two lower limits are related to the gain $\mu_1$ of the first amplifier section A′ by the formula $$\mu_1 K_1'' = K_1'$$

As the input signal to the amplifier M continues to increase, the magnitude of the direct current control voltage in the second AVC network N″ decreases, thereby maintaining the amplitude of the signal appearing in the output of the amplifier M very nearly constant though slightly increasing. When the output signal strength finally reaches a point $K_2''$ corresponding to saturation of the second AVC loop L′, there is danger that the amplitude of the output of the amplifier M would increase as indicated by the rising portion of the solid line graph $g_4$. The values of the upper limits of the AVC loops are related to the gain of the first amplifier section A′ by the formula $$\mu_1 K_2'' = K_2'$$

In order to produce a substantially uniform output of the amplifier M over a wide range of input signals, the AVC loops are so designed that the first AVC loop L′ reaches its threshold $K_1'$ before the second AVC loop reaches its upper limit $K_2''$. If the loss in signal strength between the output of the first loop L′ and the input of the second loop L″ is $s$, this condition exists if $$r > \mu s$$

If the loss in the filter F for a particular amplifier section A′ renders the value of $r$ too small, an auxiliary constant gain amplifier may be introduced between the loops to bring about the desired condition.

When the desired overlapping of the AVC limits occurs, then as the strength of the input signal increases above the upper limit $K_2''$ of the second AVC loop L″, the amplitude of the signal impressed upon the input of the second AVC loop remains substantially constant until the upper limit $K_2'$ of the first loop is reached as indicated by the dotted-line portion of curve $g_4$. Thereafter the output of the amplifier M increases with further increase in input signal strength as indicated by the rising portion of the dotted-line curve $g_4$ at the right end thereof.

In such an arrangement, the threshold $K_1''$ of the combined AVC system or amplifier M is the same as the threshold of the second AVC loop L″ and the saturation point or upper limit of AVC action is the same as the saturation point $K_2'$ of the first AVC loop L′. If a larger number of AVC loops are employed with the limits of successive loops similarly overlapping, the threshold of the combined system is that of the output loop and the upper limit of AVC operation is that of the input loop.

In order to facilitate the correlation of waves recorded at different traces of the same seismogram, or even on different seismograms, the time constants of the AVC loops are made at least several times longer than the period of the lowest frequency seismic wave to be recorded. Thus when the lowest frequency of seismic waves to be recorded is about twenty cycles per second, the effective rise or attack time constants $T_A$ of the AVC loops are set at about 0.1 second or somewhat longer and the effective recovery time constants $T_B$ at a somewhat greater value such as about 0.2 second or longer. Except when otherwise indicated, the time constants of the two loops are the same.

It is not necessary to employ a variable attenuator of the type described above in order to achieve the advantages of this invention. In another type of AVC system which may be employed in this invention, the AVC action is accomplished by means of an electromechanical AVC network $N_5$ illustrated in Fig. 8. More particularly in this case, the variable attenuator V comprises a potentiometer $U_5$, that includes a sliding contact $p$ which is connected to the input of the amplifier section A. In this arrangement, the output of the amplifier is first amplified by a power amplifier $X_5$ in the AVC network $N_5$ and is then applied to an alternating current meter $Y_5$ of the iron-vane type. The vane $v$ itself is connected by means of a shaft $p_2$ to the sliding contact of the potentiometer $U_5$ and is urged toward the maximum gain position, corresponding to zero current impressed thereon, by means of a spring $n$.

Figure 8:
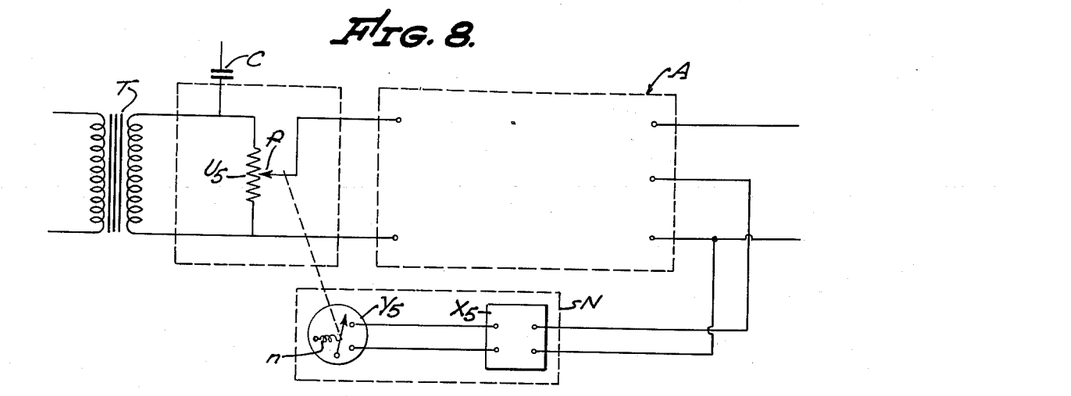
Fig. 8 is a schematic diagram of an alternative form of AVC loop that may be employed in this invention.

In operation, when signals applied to the attenuator V increase, the output of the amplifier section A increases, thereby causing a movement of the iron-vane which moves the sliding contact in such a direction as to reduce the amount of signal applied to the amplifier A. Conversely, when signal applied to the attenuator V is decreased, the sliding contact moves in the opposite direction, increasing the amount of signal applied to the amplifier section A. As a result, the AVC network $N_5$ stabilizes the output of the amplifier at a desired level.

In the system of Fig. 8, the rectification of the output signal from the amplifier section A is accomplished by the iron-vane meter $Y_5$. Also, in this system, the filtering action which is required in all AVC systems is accomplished by the inertia of the iron vane and of the shaft in combination with the compliance provided by the spring $n$ and the effective compliance of any magnetic fields or currents present. Because of such filtering, such a meter produces substantially steady deflections when alternating currents in excess of some predetermined frequency are applied. For example, such a meter may be provided that produces steady deflections at frequencies above about ten cycles per second. In effect, the meter together with its connections to the potentiometer provides a mechanical filter.

In Fig. 7 there is illustrated, by way of example, a variable gain amplifier $M_G$ that may be employed to vary the amplitude of the gain-control wave applied to the seismograph channels $H_1 \ldots H_4$. This amplifier comprises two stages employing amplifying tubes $B_7$ and $B_8$, respectively. A gain-control wave from the high-frequency oscillator HFO is amplified by the amplifier tube $B_7$ and is passed through a two-section RC high-pass filter network comprising elements $R_9$, $C_{15}$ and elements $R_{10}$, $C_{16}$ and is then applied to the tube $B_8$ which is cathode-loaded by a resistor $R_8$ and potentiometers $p'$ and $p''$.

Power is supplied to the first amplifier tube $B_7$ through an electromagnetic relay Q in the relay circuit TH. Normally, that is when the relay circuit is in its restored condition, the power-control contacts $q$ of the relay Q are closed, causing plate potential to be applied to the amplifier tube $B_7$ and across the parallel RC network J including a fixed condenser $C_5$ and a variable resistor $R_8$. When the relay Q operates, a sticking circuit (not shown) associated therewith maintains the relay in operated condition until restored by manipulation of the switch PB (see Fig. 1). While the relay is restored, the condenser $C_5$ is charged to a high voltage across the amplifier tube $B_7$ and current flows through the variable resistor $R_8$ in shunt therewith. But when the relay operates, the condenser $C_5$ discharges at a rate determined largely by the time constant of the RC network J.

While the relay is restored, a control wave from the oscillator HFO appears at the output of the amplifier $M_G$ and portions of this voltage are applied from the potentiometers $P'$ and $P''$ through coupling condensers C to the variable attenuators V as described hereinabove, thereby setting the gains of the AVC loops initially at some intermediate value. With this system, the maximum attenuation attainable by the employment of gain-control waves may be as great as that attainable by means of the AVC networks themselves.

When, by operation of the relay Q, the power supply is disconnected from the amplifier tube $B_7$, the effective amplification factor of this tube decreases gradually. As a result, the amplitude of the gain-control wave applied to the amplifier tube $B_8$ and to the variable attenuators likewise decreases. The rate of decay of the amplitude of the gain-control wave may be varied such by adjusting the time constant of the RC circuit J such as by manipulation of the variable resistor $R_8$.

A high-pass filter which comprises condensers $C_{15}$ and $C_{16}$ and resistors $R_9$ and $R_{10}$ is connected between the amplifier tubes $B_7$ and $B_8$ in order to prevent the low frequency components or surges of the change of the plate voltage of the tube B caused by the reduction of its plate supply potential from being applied to the grid of the tube $B_8$, and thence transmitted therethrough to the potentiometers $P'$ and $P''$. In practice, the cut-off frequency of this filter network may conveniently be just below the frequency of the gain-control wave, thus passing this wave substantially unattenuated while attenuating the change in plate voltage of the tube $B_3$.

As previously indicated, the frequency of the gain-control waves supplied to the AVC amplifiers is higher than that of any of the seismic waves to be recorded. When the seismic wave frequencies to be recorded include frequencies up to one hundred twenty cycles per second, the frequency of the grain-control waves may be from about three hundred cycles per second to about fifty thousand cycles per second, or even higher. More particularly, it is advantageous to employ gain-control waves having a frequency that is at least about five to ten times to the value of the highest seismic wave frequency of interest. When this condition exists, gain-control waves may be applied to the AVC loops readily without detrimental cross-feed between the several channels or detrimental feedback between loops of the same channel at seismic wave frequencies.

The values of the coupling condensers C are so chosen that they possess very low impedance at the frequency of the gain-control wave but high impedance at the frequencies of the seismic waves as compared to the input impedance to which they apply the gain-control waves. In this manner, the attenuators $V'$ and $V''$ are isolated from each other electrically at seismic wave frequencies. Thus by employing coupling condensers of such values cross-feed between amplifiers M at seismic wave frequencies is prevented. Another advantage of employing coupling condensers C of such values is that oscillation of the amplifiers that might be caused by feedback between its AVC loops at seismic wave frequencies is prevented. Furthermore, oscillation of the amplifiers at gain-control frequencies is prevented by the employment of filters F which attenuate such high frequencies between the input and output loops.

In using this system initially, when no seismic waves are being received, the amplitude of the gain-control wave applied to the first variable attenuator V is set at a value between the limits $K_1'$ and $K_2'$ and the amplitude of the gain-control wave applied to the second variable attenuator $V''$ is similarly set at a value between the limits $K_1''$ and $K_2''$. It will be noted that this condition may be attained if the voltage of the gain-control wave applied to both loops is the same and lies between the lower limit $K_1'$ of the first loop $L'$ and the upper limit $K_2''$ of the second loop $L''$. Sometimes, in practice, it is satisfactory to apply gain-control waves of the same voltage to both the first and second attenuators of the amplifiers. However, in other cases, it is more satisfactory to apply gain-control voltages in different amounts to the attenuators. In any event, with the gain-control wave thus applied, the gain of the amplifier M is of some intermediate value between the maximum and minimum gain values of which it is capable.

While the gains of the amplifiers are thus set at intermediate values, the charge of explosive E is detonated. When a train of seismic waves is received at the nearest seismometer $S_1$, the first break corresponding to the arrival of the first wave at this seismometer is recorded at high amplitude. Substantially simultaneously, relay Q operates, causing the voltage of the gain-control wave applied to the AVC loops $L'$ and $L''$ to be attenuated rapidly.

Figures 2D, 3:
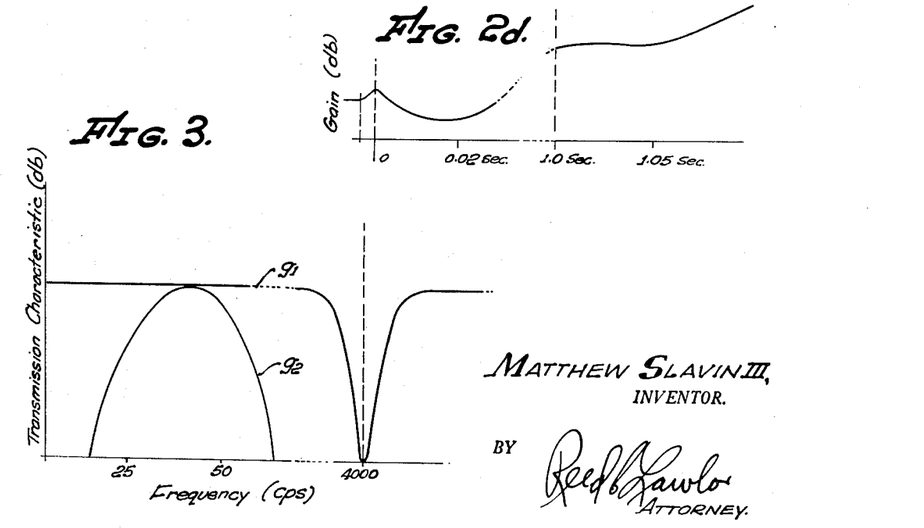
Fig. 3 is a graph showing frequency response characteristics of a filter employed in the invention.

After relay Q operates, the gains of the amplifiers $M_1$, $M_2$, $M_3$ and $M_4$ in the other channels tend to increase as shown in Fig. 2d, the rate of increase depending upon the recovery time constants of the AVC loops $L_2'$, $L_3'$, $L_4'$ and $L_2''$, $L_3''$ and $L_4''$ therein. The gain of the first amplifier $M_1$ does not increase appreciably if at all because the early arrivals are amplified and applied to the input of the AVC networks $N'$ and $N''$ almost immediately. However, there is a delay in the application of seismic wave trains to the remaining amplifiers $M_2$, $M_3$ and $M_4$. As a result, the gains of these amplifiers $M_2$, $M_3$ and $M_4$ rise and seismic waves arriving at the corresponding seismometers $S_2$, $S_3$ and $S_4$ are applied to them successively. It will be noted that the early arrival in the seismic wave trains that arrive at the seismometers $S_2$, $S_3$ and $S_4$, successively, are of different amplitudes, the amplitude generally being lower at seismometers farther from the shot-point. This diminution of amplitude of the first arrivals of seismic wave trains arriving at the respective seismometers is compensated to a very large extent by the increasing values of the gains of the respective amplifiers $M_2$, $M_3$ and $M_4$ connected thereto. Consequently, the first arrivals received at the seismometers $S_2$, $S_3$ and $S_4$, as well as that received at seismometers $S_1$ are all recorded as sharp first breaks, thus facilitating the making of accurate weathering corrections.

Immediately after the reception of the relatively high amplitude seismic waves at the commencement of the wave trains, the amplitude of the seismic waves begins to diminish and normal AVC action occurs. Thereafter the amplitudes of the waves recorded by the oscillograph O are maintained within the desired record amplification limit except possibly where sudden bursts or rapid fluctuations in amplitude occur. Normally these rapid changes are not so great as to destroy the legibility of the record, but, on the contrary, aid in recognizing and identifying corresponding waves on the separate traces. As is well known, these rapid fluctuations in amplitude, together with other changes in characteristics of the waves in different traces of the same or different records, are employed to identify waves from the same stratum or other formations.

It can be shown that the attack time of an AVC loop depends very largely upon the amplitude of the signal applied to the loop prior to the change in the signal amplitude. More particularly, it can be shown that the attack time varies continuously, being very long for low signal strengths near the lower limit $K_1$ and gradually becoming shorter until it attains a minimum at some intermediate point between the limits $K_1$ and $K_2$ and thereafter gradually becoming longer until it is very long when the signals already applied are near the upper limit $K_2$. For this reason, if no gain-control voltage is applied by the AVC networks in advance of the reception of a wave train or if either of the AVC loops is initially set at a condition below its threshold $K_1'$ or $K_1''$, a relatively long time is required for the AVC loops to become stabilized when a seismic wave train is received. But if both AVC loops are being supplied with gain-control waves within the limits of their AVC ranges, a relatively short time is required for the AVC loops to become stabilized when a seismic wave train is received. In the present system, the gain-control waves are removed at or about the time that the seismic waves are received, but the first arrivals are received while the AVC networks are still charged to points corresponding to signal levels between the AVC limits of the individual loops. As a result, the early arrivals of the wave train act upon the AVC loops rapidly, thus making it possible to record relatively early reflections at suitable amplitude.

Another advantage of employing gain-control voltages in the manner described lies in the fact that overshooting of the AVC loops and hence pinching of the records is avoided. In case no gain-control waves are applied in the manner described herein, the early arrivals in the seismic wave train overload the amplifier sections A for a relatively long period. During this time, relatively large AVC voltages are built up by the AVC networks N, thereby driving the attenuation of the attenuator V to a very high value. The time required for the AVC loops to recover self-control is a function of the AVC voltage, being longer for larger AVC voltages and shorter for smaller AVC voltages. Accordingly, if such overshooting occurs, then when waves corresponding to reflections are being received, the gains of the loops L are so low that the waves are recorded by the oscillograph with excessively low, and often illegible, amplitudes. On the other hand, when the gain-control voltages are applied in accordance with this invention, the early arrivals of the seismic wave trains overload the amplifier sections A for relatively short periods. As a result, the AVC voltages produced by the networks N due to the early arrivals is relatively low, thus driving the attenuation of the attenuators V to a lower value. It is thus apparent that by applying gain-control waves in the manner described, seismic waves may be recorded at a legible amplitude at an earlier time than otherwise. The reason that the amplifier sections A are overloaded for a shorter time when the gain-control waves are applied in advance is that the amplifier is operated initially at a lower value of gain and therefore less time is required for the amplitude of the early arrivals to drop to a point below the overload point of the amplifier.

As a further aid in avoiding pinching, the effective time constants $T_a''$ and $T_r''$ of the output loop $L''$ are made greater than the corresponding time constants $T_a'$ and $T_r'$ of the first loop.

Thus $$T_a'' > T_a'$$

and $$T_r'' > T_r'$$

The desired inequality of the effective time constants may be accomplished by employing AVC networks N'' and N' having different circuit constants. In such a case, if equal gain-control voltages are applied to the two loops, the first loop will react more quickly than the second loop to a change in amplitude of signals applied to the amplifier. Another way to accomplish this result is to employ two identical AVC networks in which the elements that determine the time constants have equal values and to impress upon the first loop, a gain-control wave of a greater amplitude than that impressed upon the second loop. More particularly, such effect may be obtained by applying to the first loop a gain-control wave which is at a point of operation where the first loop possesses a minimum attack time. Generally speaking, the point of minimum attack time is near the middle of the range $K_1'-K_2'$. At the same time, a smaller AVC gain-control voltage is applied to the second loop, causing it to have a longer effective attack time. In one specific form of the invention, this result may be obtained by applying a gain-control wave to the first loop but not to the second loop, thus presetting the gain of the first loop at a point corresponding to its AVC level, but operating the second loop below its threshold $K_1''$.

In still another way of producing longer time constants in the second loop than the first loop, the amplitude of the gain-control wave supplied to the second loop is greater than that supplied to the first loop, but both amplitudes are above those which produce minimum attack times. However, this arrangement is not so desirable as the foregoing, because the former facilitates recording first arrivals as sharp first breaks.

By setting the recovery time of the second loop greater than that of the first loop, an effect the reverse of pinching, namely, overshooting, is avoided, when the amplitude of the seismic wave train is attenuated rapidly.

In order to maintain the gains of the respective amplifiers at suitable points of operation at the times that the seismic wave trains arrive at the respective seismometers, the AVC loops are operated in such a way that they are still active when the seismic wave trains arrive at the respective seismometers. One way to assure such operation for all of the AVC loops is to set their recover time constant at a value greater than about the time elapsed between the operation of relay Q and the inception of a last train of seismic waves to arrive at one of the seismometers. Another way to assure satisfactory results is to make the sum of the time decay rate of attenuation of the gain-control waves, plus the recovery time constant about equal to or greater than the elapsed time mentioned above so that all the AVC loops are still active when the seismic wave trains arrive at the respective seismometers. Still another way is to apply gain-control waves continuously until the arrival of seismic waves at the most remote seismometers and then attenuate them rapidly. In either event, the gains of the AVC loops are set as described above when seismic wave trains are first applied thereto, thereby avoiding pinching and assuring rapid control of the respective loops by the wave trains being amplified by them.

Figure 9:
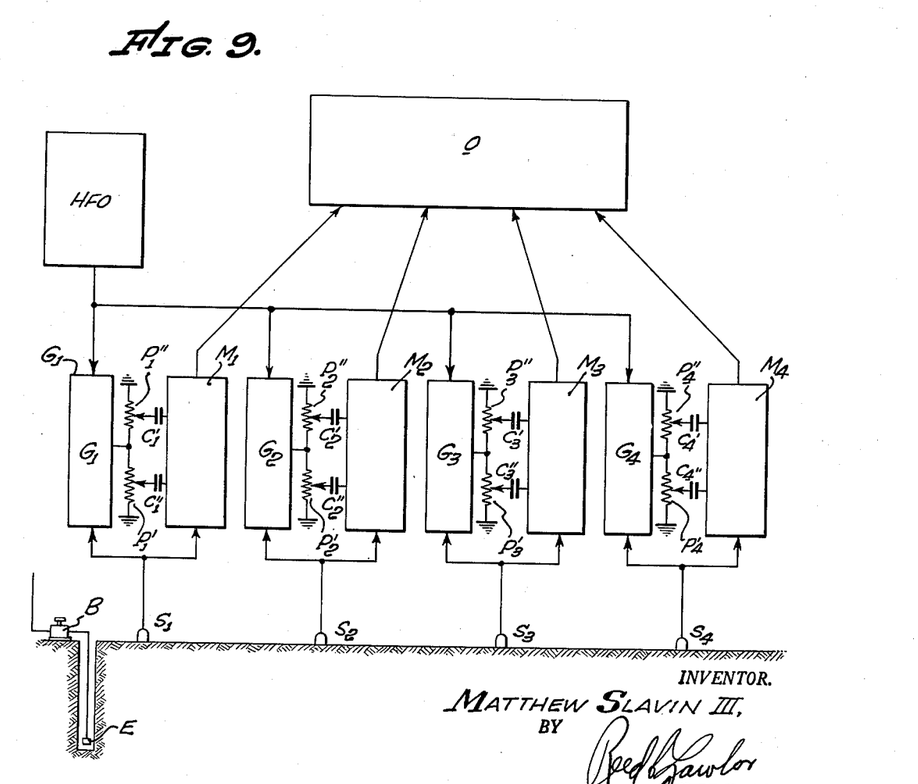
Fig. 9 is a schematic diagram of another embodiment of the invention in which separate variable gain amplifiers are employed to control the amplitude of the gain-control wave applied to the various channels.

In another embodiment of this invention illustrated in Fig. 9, individual gain-control units $G_1$, $G_2$, $G_3$ and $G_4$ of the type described above are associated with the respective amplifiers $M_1$, $M_2$, $M_3$, and $M_4$. In this system, the respective seismometers $S_1 \ldots S_4$ are connected to the inputs of the corresponding gain-control circuits $G_1 \ldots G_4$. The outputs of the individual gain-control units are connected to the inputs of the amplifier sections in the individual amplifiers $M_1 \ldots M_4$.

In this case, the gain-control wave from a common oscillator HFO is applied to the amplifiers $M_1 \ldots M_4$ through the corresponding gain-control circuits $G_1 \ldots G_4$. With this arrangement, the initial gains of the amplifier sections in the individual channels may be set to different values to adapt the channels to local conditions of the respective seismometers, and each of the gain-control systems is operated individually at the inception of the corresponding wave trains. In this case too, the time constants of the variable gain amplifiers may be adjusted individually to accommodate local conditions.

In using the system of Fig. 9, when trains of seismic waves arrive at the respective seismometers $S_1$, $S_2$, $S_3$ and $S_4$, the respective relays in the corresponding gain-control units $G_1 \ldots G_4$ are operated, thereby attenuating the gain-control waves applied to the inputs of the amplifier sections. In practice with such an arrangement, the initial gains of the amplifier sections of the various amplifiers are set at any desired values in order to prepare these amplifiers $M_1 \ldots M_4$ to amplify the first arrivals of the respective seismic wave trains by suitable amounts to render all of them legible on the record. In addition, individual adjustment of the initial gains of the respective amplifier sections may be utilized to eliminate pinching in the individual channels. In the most effective method of employing this system, the amplitudes of the gain-control waves applied to the individual channels are made about equal to the amplitudes of the first arrivals to be recorded by them, thus assuring recording all first arrivals at about the same record amplitude.

Figure 10:
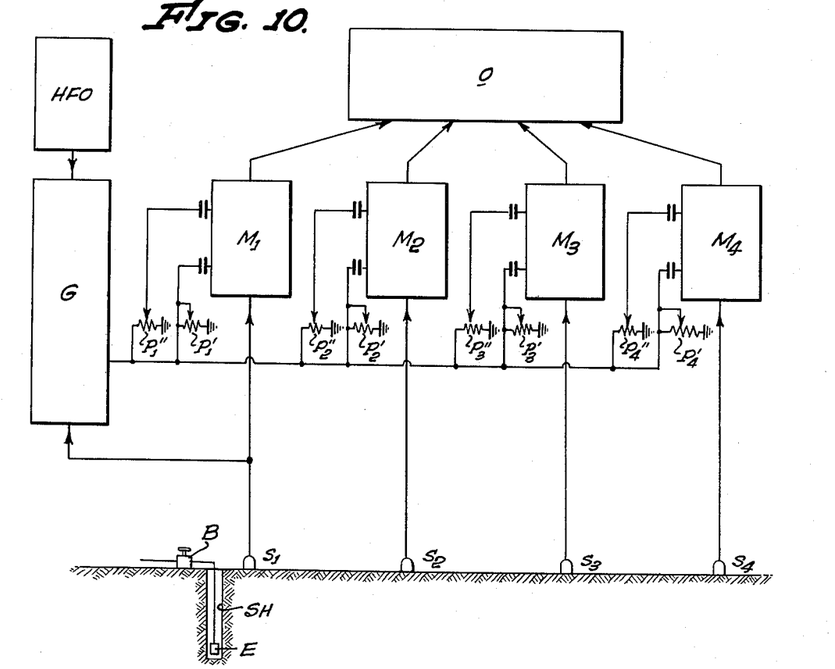
Fig. 10 is a block diagram of a system in which gain-control waves of different amplitudes are applied to different channels.

In another embodiment of the present invention herewith illustrated in Fig. 10, gain-control signals of different amplitudes are applied to the various AVC loops of the several amplifiers initially. This system will be seen to be substantially the same as that shown in Fig. 1, except that individual potentiometers at the output of a common gain-control device G are now provided at the inputs to the individual AVC loops. In this system the potentiometers are initially adjusted to apply gain-control waves of suitable magnitudes to the various AVC loops. Normally in this case, the amplitudes of the gain-control waves that are applied to the respective amplifiers $M_1 \ldots M_4$ associated with seismometers $S_1 \ldots S_4$ vary with the distance to the seismometers $S_1 \ldots S_4$, being smaller for nearby seismometers and larger for more distant seismometers. In this case when the common gain-control circuit G operates in response to the first arrival at the nearest seismometer $S_1$, the gain-controlling waves supplied to the several amplifiers are all attenuated as the same function of time. However, the time required for the gain-control wave to fall to a predetermined value varies as its initial amplitude, being shorter for smaller amplitudes and longer for larger amplitudes. As a result, the time elapsed for a given condition to be attained in the amplifiers $M_1 \ldots M_4$ increases with the distance of the individual corresponding seismometers $S_1 \ldots S_4$ from the shotpoint SH. Hence, the first arriving seismic waves at the seismometers near the shotpoint are attenuated an amount predetermined by the amplitude of the gain-control waves injected into these amplifiers. Moreover, the first arriving seismic waves at the seismometers at some distances from the shotpoint arrive at some later time, but since the injected gain-control waves in these last amplifiers are larger than the corresponding gain-control waves supplied to the amplifiers associated with the seismometers close to the shotpoint, the AVC systems of these amplifiers are preloaded initially to a greater extent than the amplifiers associated with the seismometers close to the shotpoint.

It is clear that the individual potentiometers corresponding to the respective channels $H_1 \ldots H_4$ may be adjusted to take into account the differences in amplitude, as well as the differences in travel time of the first arrivals. For most effective results, the potentiometers are so set that the amplitude of the gain-control waves applied to the individual amplifiers when seismic waves are applied to them are about equal to the amplitudes of those seismic waves. The overall result of this operation is that the first arrivals at the respective seismometers may be recorded at about the same record amplitude, regardless of the fact that some of them are received later than others. In such a system, shortly after the reception of the first arrivals, the gains of the individual amplifiers are controlled very largely by the respective seismic wave trains being received.

Figure 11:
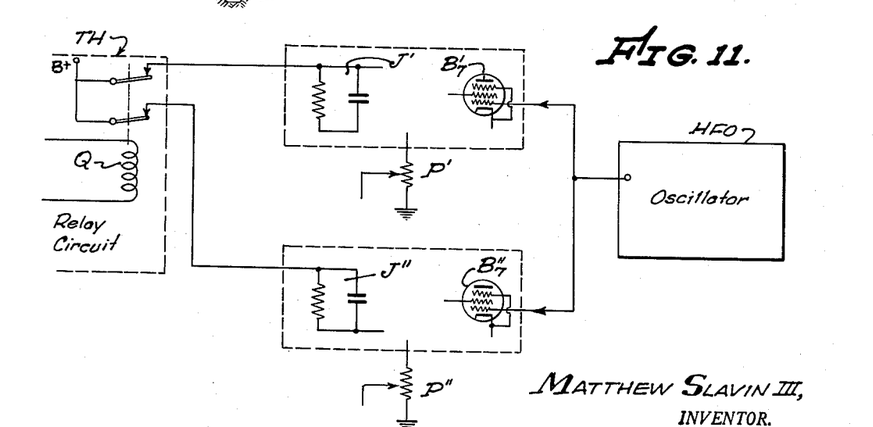
Fig. 11 is a block diagram of a system in which gain-control waves applied to different AVC loops are attenuated at different rates.

In the embodiment of the invention illustrated in Fig. 11, the gain-control waves applied to the first and second loops of the AVC amplifiers are attenuated at different rates. This system is similar to the arrangement of Fig. 1 except that the gain-control wave from the oscillator HFO is applied to the potentiometers $P'$ and $P''$ through two separate gain-control amplifiers operated from the same relay circuit TH. The individual gain-control amplifiers $M_G$ are identical in construction with that shown in Fig. 7, each having its own timing circuit $J'$ and $J''$. Power from the B+ supply is applied across each of these timing circuits through individual normally closed contacts $q'$ and $q''$ of the relay circuit. The outputs from the gain-control amplifiers $M_G'$ and $M_G''$ appear across the respective potentiometers $P'$ and $P''$ which are connected to the individual AVC loops of the several amplifiers. When the relay circuit TH operates, the contacts $q'$ and $q''$ open simultaneously, removing the plate supply voltage to the first stage of each of the variable gain amplifiers $M_G'$ and $M_G''$. Thereafter the plate supply voltages for the tubes $B_7'$ and $B_7''$ decrease. In this case, however, since the individual timing circuits $J'$ and $J''$ are separately adjustable, the output voltages available at the potentiometers $P'$ and $P''$ may be attenuated at different rates. Hence, the gain-control waves supplied to the first and second AVC loops of the several amplifiers cannot only be varied in amplitude by adjusting the potentiometers $P'$ and $P''$, but they may also be attenuated at different rates.

Figure 12:
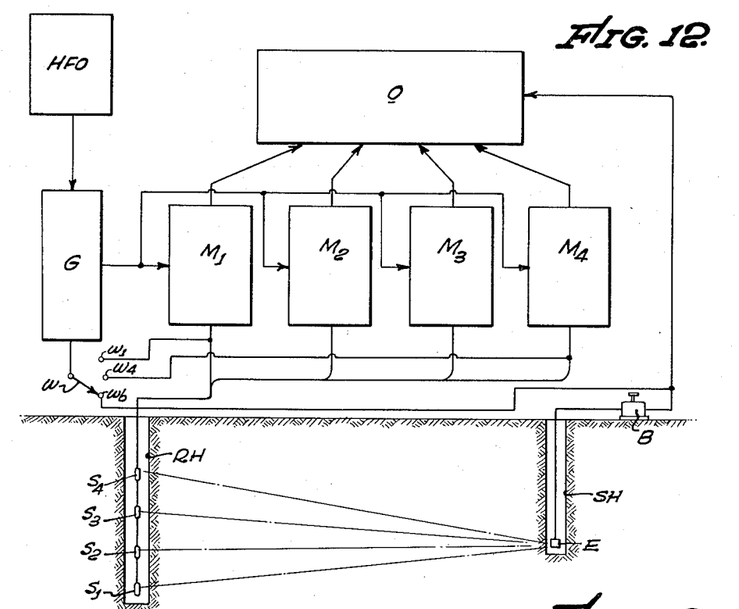
Fig. 12 is a schematic diagram of a system in which the invention is applied to a vertical spread.

In the apparatus shown in Fig. 12, the invention is applied to a system of the kind disclosed and claimed in copending patent application Serial No. 319,969, filed November 12, 1952, by Raymond A. Peterson. In this system the seismometers $S_1 \ldots S_4$ are arranged in a vertical line in a receiver hole RH spaced some distance from the shothole SH, and the respective seismometers $S_1 \ldots S_4$ are connected to the inputs of the corresponding amplifiers $M_1 \ldots M_4$. According to the present invention, the gains of these amplifiers are controlled by means of gain-control waves supplied from a high-frequency oscillator HFO through a common gain-control device G in the manner previousl described.

In the system shown in Fig. 12, a switching arrangement $w$ is connected at the input of the gain-control device G. This device has contacts $w_1$ and $w_4$ connected, respectively, to the seismometers $S_1$ and $S_4$ and an additional set of contacts $w_b$ connected to the blaster B. With this switching arrangement, the gain-control device G may be selectively set to respond to either first arrivals reaching the seismometers $S_1$ or $S_4$ or to a signal from the blaster B.

In the operation of the system illustrated in Fig. 12 some of the waves produced by detonation of the explosive charge E at the bottom of the shothole SH travel in a horinzontal direction by direct paths to the seismometers $S_1 \ldots S_4$. Subsequently, waves refracted or reflected from underlying formations also arrive at the seismometers to form wave trains of the general character of those previously considered herein. Inasmuch as these seismometers are arranged in a vertical string offset from the shothole SH, the differences in the time of inception of the wave trains is very short. In this case the time constant of variable gain amplifier is normally set at about 0.02 second or less, that is, at a value less than the period required for the seismic wave trains to attain the maximum values.

In this case the first arrivals reach the seismometers $S_1 \ldots S_4$ at about the same time. For that reason, it is desirable to connect the gain-control device G to the seismometer which is the first to receive a wave train. Inasmuch as this is generally the top or bottom seismometer, it is only necessary to provide a switching arrangement for connecting the input of the gain-control device G to one or the other of these. If desired, the gain-control device G may also be operated in response to a signal from the blaster B.

Figure 13:
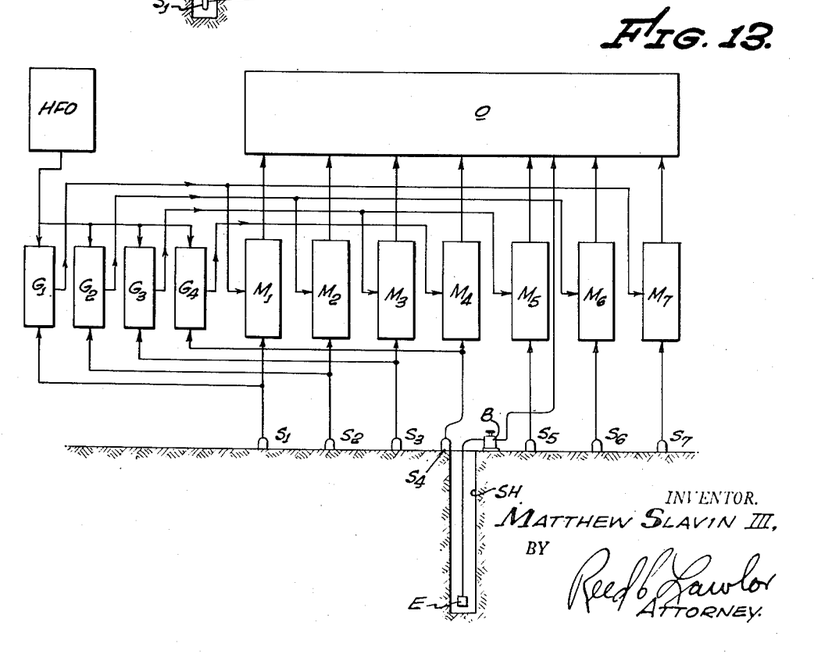
Fig. 13 is a schematic diagram of a system in which the invention is applied to a split spread.

In the apparatus shown in Fig. 13, the invention is applied to a split spread comprising seismometers $S_1 \ldots S_7$ which are connected, respectively, to amplifier channels $M_1 \ldots M_7$, the outputs of which are applied to the multiple-element oscillograph O. The seismometers are arranged on a line symmetrically about the shothole SH. In this case, four gain-control devices $G_1 \ldots G_4$ are employed. This system is similar to that shown in Fig. 9, but in this case the inputs of gain-control units $G_1$, $G_2$, $G_3$ and $G_4$ are connected to the respective seismometers $S_1$, $S_2$, $S_3$ and $S_4$. But in this case, the output of first gain-control unit $G_1$ is applied to both the outside or end seismometers $S_1$ and $S_7$, the output of the second gain-control device $G_2$ is applied to the next seismometers $S_2$ and $S_6$ from the opposite end, the output of the third gain-control device $G_3$ is applied to the next two seismometers $S_3$ and $S_5$, and the output of the fourth gain-control device $G_4$ is applied to the center seismometer $S_4$.

As is well known, a wave train generally reaches the central seismometer $S_4$ first. Then a wave train reaches the next seismometers on opposite sides from the central seismometer $S_4$ at about the same time, and then other wave trains reach other remaining symmetrically located pairs on opposite sides at successively greater times. In this particular system then, the gain-control devices $G_4 \ldots G_1$ are operated in succession in the order named, thus causing the gains of the various amplifiers to have values suitable for recording waves received at different times. It will be understood, of course, that this result may be achieved in other ways, such as by employing a common relay circuit which is operated by the blaster B and a series of gain-control amplifiers, each of which supplies gain-control voltages in equal amounts to amplifiers located symmetrically with respect to the shotpoint SH. In this system, the respective gain-control amplifiers may be provided with different time constants so that the gain-control waves applied to various amplifiers corresponding to seismometers located at different distances from the shotpoint SH may be attenuated at suitable rates to assure sharp recording of first arrivals and adequate AVC operation.

It thus appears that in all of the systems described the AVC loops are controlled entirely by the gain-control waves prior to the reception of the seismic wave trains and that at the inception of the seismic wave trains, the AVC loops are controlled, either directly or indirectly, partly by the gain-control waves and partly by the arriving seismic waves. Subsequently, however, the AVC loops are controlled entirely by the seismic waves.

As a general rule, in an AVC system, the amplification of signals of any strength or amplitude is substantially independent of the constants of the various circuit elements, except for the means, such as battery D, that determines the threshold of operation. According to this invention, the advantage of this feature of AVC action is obtained by applying gain-control waves to the inputs of the attenuators V. Thus, with this invention, substantially equal amplification is obtained in all of the channels $H_1 \ldots H_4$ at the commencement of the wave trains, as well as at a later time during the reception of the wave trains. Furthermore, according to this invention, this advantage is attained in a high-gain amplifier capable of wide range AVC action without danger of excessive cross-feed between channels and without danger of oscillation or instability due to feed-back of energy from one AVC loop to another.

A further advantage of employing the gain-control voltages in accordance with this invention lies in the fact that all the AVC loops are active initially, thus being prepared to respond rapidly to changes in the amplitudes of seismic waves. Not only does this arrangement facilitate rapid control at the commencement of a seismic wave train, but it also prevents instability of any kind which might cause the gain-control loops to reduce the gains to such a point that the amplification is insufficient for recording seismic waves for a substantial period after the commencement of the wave trains.

Though the invention has been described above only with reference to the use of variable attenuators in the AVC loops, it is clear that it may also be applied in systems in which the AVC control voltages are applied in other ways. More particularly, for example, the invention may be employed in an AVC system in which the control voltages are applied to grids of the amplifier tubes. It will also be evident that some of the advantages of this invention may be obtained when the gain-control voltages are fed forwardly from the input rather than backwardly from the output. Some of the advantages of the invention may be obtained if only one AVC loop is employed in amplifier M. In either event, control voltage is employed to vary the gain of the amplifier in accordance with the amplitude of the signals being impressed upon the amplifier and this control voltage is established initially by means of a high-frequency gain-control wave.

While this invention has been described above with particular application to a seismic prospecting system in which a train of seismic waves is generated by detonation of a charge of explosive, it will be clear that it may also be applied to other seismic prospecting systems and even other systems in which similar wave trains are received. It is therefore to be understood that this invention is not limited solely to the forms of the invention described and illustrated herein, but that it may be embodied in many other forms within the scope of the appended claims.

The invention claimed is:

1. In seismic prospecting apparatus for reproducing and observing a train of seismic waves which are of relatively high amplitude at the commencement thereof and subsequently diminish in amplitude, and in which the train of seismic waves is converted into a corresponding train of electrical waves, the improvement comprising: a seismic-wave amplifier comprising an AVC loop having an input and an output; means for applying said train of electrical waves to the input of said AVC loop; generating means external to said loop for generating high frequency electrical waves of a frequency higher than the frequencies of said seismic waves; said AVC loop being adapted to regulate the amplitude of waves appearing at its output at all such frequencies; means for applying high frequency electrical waves from said generating means to the input of said AVC loop; and means for reducing the amplitude of said high-frequency waves applied to the input of said loop at about the time that said electrical wave train is first applied whereby the gain of said loop is maintained below its maximum value until after said electrical wave train is applied.

2. In seismic prospecting apparatus for reproducing and observing a train of seismic waves which are of relatively high amplitude at the commencement thereof and subsequently diminish in amplitude, and in which the train of seismic waves is converted into a corresponding train of electircal waves, the improvement comprising: a seismic wave amplifier comprising an AVC loop having an input and an output; means for applying said train of electrical waves to the input of said AVC loop; generating means external to said loop for generating high frequency electrical waves of a frequency higher than the frequencies of said seismic waves; said AVC loop being adapted to regulate the amplitude of waves appearing at its output at all such frequencies; means for applying high frequency electrical waves from said generating means to the input of said AVC loop to set the gain of said AVC loop below its maximum value; means for reducing the amplitude of said high-frequency electrical waves applied to the input of said loop prior to the time that said electrical wave train is first applied thereto; and means for maintaining said gain below its maximum value until after said electrical wave train is applied.

3. In seismic prospecting apparatus for reproducing and observing a train of seismic waves which are of relatively high amplitude at the commencement thereof and subseqeuntly diminish in amplitude, and in which the train of seismic waves is converted into a corresponding train of electrical waves, the improvement comprising: a seismic-wave amplifier comprising first and second AVC loops, each having an input and an output; a filter connected between the output of the first loop and the input of the second loop, said filter being adapted to pass waves in a predetermined range; means applying said train of electrical waves to the input of said first AVC loop; generating means external to said loops for generating high frequency electrical waves of a frequency higher than the frequencies of said seismic waves and outside said range; said AVC loops being adapted to regulate the amplitude of waves appearing at their outputs at all such frequencies; means for applying high frequency electrical waves from said generating means to the input of each said AVC loops to set the gains of said loops below their maximum values; and means for reducing the amplitude of said high-frequency waves applied to said loops at about the time that said electrical wave train is first applied whereby the gains of said loops are maintained below their maximum values until after said electrical wave train is applied.

4. In seismic prospecting apparatus for reproducing and observing a train of seismic waves which are of relatively high amplitude at the commencement thereof and subsequently diminish in amplitude, and in which the train of seismic waves is converted into a corresponding train of electrical waves, the improvement comprising: a seismic wave amplifier comprising first and second AVC loops each having an input and an output; a filter connected between the output of the first loop and the input of the second loop, said filter being adapted to pass waves in a predetermined range; means for applying said train of electrical waves to the input of said first AVC loop; generating means external to said loops for generating high frequency electrical waves of a frequency higher than the frequencies of said seismic waves and outside said range; said AVC loops being adapted to regulate the amplitude of waves appearing at their outputs at all such frequencies; means for applying high-frequency electrical waves from said generating means to the input of each of said AVC loops to set the gains of said loops below their maximum values; means for reducing the amplitude of said high-frequency electrical waves applied to said loops prior to the time that said electrical wave train is first applied; and means for maintaining said gains below their maximum values until after said electrical wave train is applied.

5. In seismic prospecting apparatus for reproducing and observing a train of seismic waves which are of relatively high amplitude at the commencement thereof and subsequently diminish in amplitude, and in which the train of seismic waves is converted into a corresponding train of electrical waves, the improvement comprising: a seismic wave amplifier comprising first and second AVC loops each having an input and an output; a filter connected between the output of the first loop and the input of the second loop, said filter being adapted to pass waves in a predetermined range and to suppress waves of a specified high frequency; means for applying said train of electrical waves to the input of said first AVC loop; a source of gain-control waves of such high frequency external to said loops; said AVC loops being adapted to regulate the amplitudes of waves appearing at their outputs at all such frequencies; means connected to said source for applying such gain-control waves to the input of each of said AVC loops to set the gains of said AVC loops below their maximum values; and means for reducing the amplitude of said gain-control waves applied to said loops at about the time that said electrical wave train is first applied and for maintaining said gains below their maximum value until after said electrical wave train is applied.

6. In seismic prospecting apparatus, the combination of: means for generating a train of seismic waves that are of relatively high amplitude at the commencement thereof and subsequently diminish in amplitude; means for receiving such a train of seismic waves and for converting them into a corresponding train of electrical waves; a seismic wave amplifier comprising an AVC loop; generating means external to said loops for generating high frequency electrical waves of a frequency higher than the frequencies of said seismic waves; said AVC loop being adapted to regulate the amplitude of waves appearing at its output at all such frequencies; means for applying said train of electrical waves to the input of said AVC loop; means for applying high-frequency electrical waves from said generating means to the input of said AVC loop to set the gain of said AVC loop below its maximum value; attenuation means for reducing the amplitude of said high-frequency electrical waves applied to the input of said AVC loop; means for initiating the operation of said attenuation means in timed relationship with the generation of said seismic wave train and prior to the time that said electrical wave train is applied; and means for maintaining said gain below its maximum value until after said electrical wave train is applied.

7. In seismic prospecting apparatus, the combination of: means for generating a train of seismic waves that are of relatively high amplitude at the commencement thereof and subsequently diminish in amplitude; means for receiving such a train of seismic waves and for converting them into a corresponding train of electrical waves; a seismic wave amplifier comprising an AVC loop; generating means external to said loop for generating high frequency electrical waves of a frequency higher than the frequencies of said seismic waves; said AVC loop being adapted to regulate the amplitude of waves appearing at its output at all such frequencies; means for applying said train of electrical waves to the input of said AVC loop; means for applying high-frequency electrical waves from said generating means to the input of said AVC loop to set the gain of said AVC loop below its maximum value; and means controlled by the reception of said train of seismic waves for reducing the amplitude of said high-frequency electrical waves applied to the input of said AVC loop.

8. In seismic prospecting apparatus for reproducing and observing a train of seismic waves which are of relatively high amplitude at the commencement thereof and subsequently diminish in amplitude, and in which the train of seismic waves is converted into a corresponding train of electrical waves, the improvement comprising: a seismic wave amplifier comprising first and second amplifier sections, each section having an input and an output; a first variable attenuator having a first input and a first output, said first output being connected to the input of the first amplifier section; a second variable attenuator having a second input and a second output, said second output being connected to the input of the second amplifier section; a filter connected between the output of the first section and the input of the second variable attenuator, said filter being adapted to pass waves in a predetermined range; means for applying said train of electrical waves to the input of said first variable attenuator; generating means for generating high frequency electrical waves of a frequency higher than the frequencies of said seismic waves and outside said range; means connected to the output of each said amplifier section for varying the degree of attenuation produced by the corresponding attenuator at the input thereof as an inverse function of the amplitude of the signal at the output of said each amplifier section, such attenuation occurring at all such frequencies; means for applying high-frequency electrical waves from said generating means to the input of each said variable attenuator to set the attenuation of said attenuators above their minimum values; and means for reducing the amplitude of said high-frequency electrical waves applied to the input of said AVC loop at about the time that said electrical wave train is first applied thereto and for maintaining the attenuations of said attenuators above their minimum values until after said electrical wave train is applied.

9. In seismic prospecting apparatus for reproducing and observing a train of seismic waves which are of relatively high amplitude at the commencement thereof and subsequently diminish in amplitude, and in which the train of seismic waves is converted into a corresponding train of electrical waves, the improvement comprising: a seismic wave amplifier comprising two amplifier sections, each section having an input and an output; a first variable attenuator having a first input and a first output, said first output being connected to the input of the first amplifier section; a second variable attenuator having a second input and a second output, said second output being connected to the input of the second amplifier section; a filter connected between the output of the first section and the input of the second variable attenuator, said filter being adapted to pass waves in a predetermined range and to suppress waves of a specified high frequency; means for applying said train of electrical waves to the input of said first variable attenuator; an AVC network connected to the output of each said amplifier section for varying the degree of attenuation produced by the corresponding attenuator at the input thereof as an inverse function of the amplitude of the signal at the output of said each amplifier section, such attenuation occurring at all such frequencies; a source of gain-control waves of said high frequency external to said network; means connected to said source for applying to the input of each said variable attenuator electrical waves of said high frequency to set the attenuations of said attenuators above their minimum values; and means for reducing the amplitude of said gain-control waves applied to said attenuators at about the time that said electrical wave train is first applied and for maintaining the attenuations of said attenuators above their minimum values until after said electrical wave train is applied.

10. In seismic prospecting apparatus, the combination of: a seismic wave amplifier comprising two amplifier sections, each section having an input and an output; a first variable attenuator having a first input and a first output, said first output being connected to the input of the first amplifier section; a second variable attenuator having a second input and a second output, said second output being connected to the input of the second amplifier section; a filter connected between the output of the first section and the input of the second variable attenuator, said filter being adapted to pass waves in a predetermined range and to suppress waves of a specified high frequency; means for applying a train of electrical waves to the input of said first variable attenuator; an AVC network connected to the output of each said amplifier section for varying the degree of attenuation produced by the corresponding attenuator at the input thereof as an inverse function of the amplitude of the signal at the output of said each amplifier section; such attenuation occurring at all such frequencies; a source of waves of said high frequency external to said AVC networks; means for applying waves of said high frequency from said source to the input of each said variable attenuator; and means controlled by the reception of said train of seismic waves for reducing the amplitude of said high-frequency electrical waves applied to said attenuators.

11. In seismic prospecting apparatus in which trains of seismic waves are respectively received at a plurality of seismometers, the inception of the seismic wave train at the different seismometers occurring at different times, and in which said trains of seismic waves are of relatively high amplitude at the commencement thereof and subsequently diminish in amplitude, and in which the respective seismometers convert the trains of seismic waves into corresponding trains of electrical waves, the combination of: a plurality of seismic wave amplifiers, each comprising an AVC loop having an input and an output; a source of gain-control waves of a frequency that is high compared with the frequencies of the seismic waves external to said loops; said AVC loops being adapted to regulate the amplitudes of waves appearing at their outputs at all such frequencies; means connected to said source for applying said gain-control waves to the input of each of said loops; and means for reducing the amplitude of said gain-control waves at about the same time that seismic waves are first received by any of said seismometers and for maintaining the gain of each amplifier below its maximum value until after seismic waves are received thereby.

12. In seismic prospecting apparatus in which trains of seismic waves are respectively received at a plurality of seismometers, the inception of the seismic wave train at the different seismometers occurring at different times, and in which said trains of seismic waves are of relatively high amplitude at the commencement thereof and subsequently diminish in amplitude, and in which the respective seismometers convert the trains of seismic waves into corresponding trains of electrical waves, the combination of: a plurality of seismic wave amplifiers, each comprising an AVC loop having an input and an output; a source of gain-control waves of a frequency that is high compared with the frequencies of the seismic waves external to said loops; said AVC loops being adapted to regulate the amplitudes of waves appearing at their outputs at all such frequencies; means connected to said source for applying gain-control waves to the input of each of said loops; means controlled by the initial reception of waves at one of said seismometers for reducing the amplitude of said control waves; and means for reducing the amplitude of said gain-control waves at about the same time that seismic waves are first received by any of said seismometers and for maintaining the gain of each amplifier below its maximum value until after seismic waves are received thereby.

13. In seismic prospecting apparatus in which trains of seismic waves are respectively received at a plurality of seismometers located at different distances from a seismic wave source, the inception of the seismic wave train at the different seismometers occurring at different times, and in which said trains of seismic waves are of relatively high amplitude at the commencement thereof and are of subsequently gradually diminishing amplitude, and in which the respective seismometers convert the trains of seismic waves into corresponding trains of electrical waves, the combination of: a plurality of seismic wave amplifiers, each comprising two AVC loops, each having an input and an output; a plurality of filters each connected between the output of a first AVC loop and the input of a second AVC loop of each amplifier, said filters being adapted to pass waves in a predetermined range and to suppress waves of a specified high frequency; a source of gain-control waves of such high frequency external to said loops; said AVC loops being adapted to regulate the amplitudes of waves appearing at their outputs at all such frequencies; means connected to said source for applying gain-control waves to the input of each of said AVC loops; and means for reducing the amplitude of said gain-control waves at about the same time that seismic waves are first received by any of said seismometers and for maintaining the gain of each amplifier below its maximum value until after seismic waves are received thereby.

14. In seismic prospecting apparatus in which trains of seismic waves are respectively received at a plurality of seismometers, the inception of the seismic wave trains at the different seismometers occurring at different times, and in which said trains of seismic waves are of relatively high amplitude at the commencement thereof and subsequently diminish in amplitude, and in which the respective seismometers convert the trains of seismic waves into corresponding trains of electrical waves, the combination of: a plurality of seismic-wave amplifiers, each seismic-wave amplifier comprising two amplifier sections, each section having an input and an output; a plurality of first variable attenuators, each having an input and an output, the output of each first attenuator being connected to the input of a corresponding first amplifier section, and the input of each first variable attenuator being connected to the corresponding seismometer; a plurality of second variable attenuators, each having an input and an output, the output of each second attenuator being connected to the input of a corresponding second amplifier section; a plurality of filters each connected between the output of a first amplifier section and the input of a second variable attenuator, said filters being adapted to pass waves in a predetermined range and to suppress waves of a specified high frequency; an AVC network connected between the output of each said amplifier section for varying the degree of attenuation produced by the attenuator connected at its input as an inverse function of the amplitude of the signal at the output of said each amplifier section; a source of gain-control waves of such high frequency external to said network; means connected to said source for applying gain-control waves from said source to the input of each of said variable attenuators; and means for reducing the amplitude of said gain-control waves prior to the time that seismic waves are first received by any of said seismometers and for maintaining the gain of each amplifier below its maximum value until after seismic waves are received thereby.

15. In seismic prospecting apparatus for reproducing and observing a train of seismic waves which are of relatively high amplitude at the commencement thereof and subsequently diminish in amplitude, and in which the train of seismic waves is converted into a corresponding train of electrical waves, the improvement comprising: a seismic-wave amplifier having an input and an output; means for applying said train of electrical waves to the input of said amplifier; gain control means for varying the gain of said amplifier as an inverse function of the amplitude of waves applied to its input at all such frequencies; a source of high frequency electrical waves having a frequency that is high compared with the frequencies of said seismic waves, said source being external to said gain control means; means for applying high-frequency electrical waves from said source to the input of said amplifier; and means for reducing the amplitude of said high-frequency electrical waves at about the time that said electrical wave train is first applied.

16. In seismic prospecting apparatus for reproducing and observing seismic waves, the improvement comprising: a seismic-wave amplifier having an input and an output; means for receiving seismic waves and for converting them into corresponding electrical waves; means for applying said electrical waves to said input; gain control means for varying the gain of said amplifier inversely as amplitude of waves applied to its input; a source of high frequency electrical waves having a frequency that is high compared with the frequencies of said seismic waves, said source being external to said gain control means; means for applying high frequency electrical waves from said source to the input of said amplifier; means for varying the amplitude of the electrical waves applied from said source to the input of said amplifier to affect the gain of said amplifier; and means connected to the output of said amplifier for recording said corresponding electrical waves.

17. In apparatus for reproducing and observing a train of waves which are of relatively high amplitude at the commencement thereof and subsequently diminish in amplitude, and in which the train of waves is converted into a corresponding train of electrical waves, the improvement comprising: an amplifier having an input and an output; means for applying said train of electrical waves to the input of said amplifier; gain control means for varying the gain of said amplifier inversely as the amplitude of waves applied to its input at all such frequencies; a source of high frequency electrical waves having a frequency that is high compared with the frequencies of said seismic waves, said source being external to said gain control means; means for applying high frequency electrical waves from said source to the input of said amplifier; and means for reducing the amplitude of the high frequency electrical waves applied to said amplifier at about the time that such train of waves is received.

18. In apparatus for reproducing and observing a train of seismic waves which are of relatively high amplitude at the commencement thereof and subsequently diminish in amplitude, and in which the train of seismic waves is converted into a corresponding train of electrical waves, the improvement comprising: an amplifier having an input and an output; means for receiving such a train of seismic waves and applying said train of electrical waves to the input of said amplifier; a source of high frequency electrical waves having a frequency that is high compared with the frequencies of said seismic waves; gain control means for varying the gain of said amplifier inversely as the amplitude of waves applied to its input at all such frequencies, said source being external to said gain control means; means for applying high frequency electrical waves from said source to the input of said amplifier; and means for reducing the amplitude of the high frequency electrical waves applied to said amplifier at about the time that such train of seismic waves is received.

19. In seismic prospecting apparatus, the combination of: means for generating a train of seismic waves that are of relatively high amplitude at the commencement thereof and subsequently diminish in amplitude; means for receiving such a train of seismic waves and for converting them into a corresponding train of electrical waves; an amplifier having an input and an output; means for applying the train of electrical waves to the input of said amplifier; a source of high frequency electrical waves having a frequency that is high compared with the frequencies of said seismic waves; gain control means for varying the gain of said amplifier inversely as the amplitude of waves applied to its input at all such frequencies, said source being external to said gain control means; means for applying high frequency electrical waves from said source to the input of said amplifier; and means controlled by the generation of said train of seismic waves for attenuating the high frequency waves applied to the input of said amplifier at about the time that the train of seismic waves is received.

References Cited in the file of this patent

UNITED STATES PATENTS

| Number | Name | Date |
|---|---|---|
| 1,681,532 | Gardner | Aug. 21, 1928 |
| 2,301,739 | Minton | Nov. 10, 1942 |
| 2,367,049 | Petty | Jan. 9, 1945 |
| 2,375,570 | McDermott | May 8, 1945 |
| 2,395,481 | Hoover | Feb. 26, 1946 |
| 2,462,552 | Renner | Feb. 22, 1949 |
| 2,497,883 | Harris | Feb. 21, 1950 |
| 2,527,441 | O'Brien | Oct. 24, 1950 |
| 2,554,132 | Van Zelst | May 22, 1951 |
| 2,612,568 | Hemphill | Sept. 30, 1952 |
| 2,626,993 | Wright et al. | Jan. 27, 1953 |